June 4, 1946.                A. A. HANSEN                2,401,347
                           IMPULSE GENERATOR
                         Filed Dec. 26, 1942

INVENTOR
A. A. HANSEN
BY
P. C. Smith
ATTORNEY

Patented June 4, 1946

2,401,347

UNITED STATES PATENT OFFICE 2,401,347

IMPULSE GENERATOR

Arnold A. Hansen, Maplewood, N. J., assignor to Bell Telephone Laboratories, Incorporated, New York, N. Y., a corporation of New York Application December 26, 1942, Serial No. 470,275

6 Claims. (Cl. 179—175.2)

This invention relates to magnetic devices and more particularly to an impulse generator.

It is often desirable in signaling and other systems to have available an impulse source which will deliver impulses at an accurate speed and with each impulse produced with an accurate percentage of the open or break period to the close or make period. Accurate impulses of this character have special application to the maintenance of intertoll and certain of the local equipment of step-by-step type dial switching systems for checking or regulating the performance of such equipment.

In connection with intertoll dialing maintenance in systems where a comparatively small amount of pulsing equipment is involved, portable testing equipment is now employed which is expensive and which must be plugged in on toll test positions of the switchboard during testing operations, thus interfering with the regular service use of such positions. It is therefore desirable to have a source of test impulses available on jack appearances so that it may be extended to the toll test board from which position over-all pulsing tests of the entire circuits may be made; to the relay rack; to composite signaling locations and to selector frames. From a cost standpoint and from a plant operation standpoint, it is not always practicable to assign a portable test set to permanent use as a part of a fixed test network for each intertoll dialing office. The present invention has therefore for its object the provision of a source of accurate impulses which will be cheap enough to warrant its installation in each intertoll dialing office as a part of a fixed testing network for such office and for other similar uses.

For the purpose above stated, the impulse source must be capable of producing impulses at the rate of twelve impulses per second. A synchronous motor-driven interrupter of one of the well-known types would, of course, be capable of producing impulses at a sufficiently accurate speed, but if cam-operated contacts are employed, a considerable load is placed upon the motor to operate the heavy spring arrangement reliably, thus requiring a motor of considerable power and cost. Also certain undesirable maintenance and adjustment of mechanical parts due to wear is involved. It is therefore necessary, in order to employ an inexpensive motor, to provide contact operating mechanism which will require a minimum of power for its operation. To attain the object of the invention, a well-known type of polarized relay, which from past experience in the telephone and telegraph fields has been found to function accurately for the reproduction of impulses, has been arranged to have its reed armature affected magnetically so that it will vibrate or operate its contacts at the desired impulse generation speed of twelve impulses per second under the control of synchronous motor. The proposed magnetic drive comprises a disc or similar type permanent magnet of high coercive force mounted on a shaft rotated at the required impulsing speed by a synchronous motor and positioned with respect to the magnetic circuit of the relay in such a manner as to cause the cycling of the relay armature once for each revolution of the magnet. Various other portions of the rotating disc with respect to the relay structure may be used, or a single disc may be located between two structures and operate both of them. Various magnetic shielding or masking features might be used to limit the effective field actions.

For a clearer understanding of the invention, reference may be had to the following detailed description taken in connection with the attached drawing in which.

Figure 1:
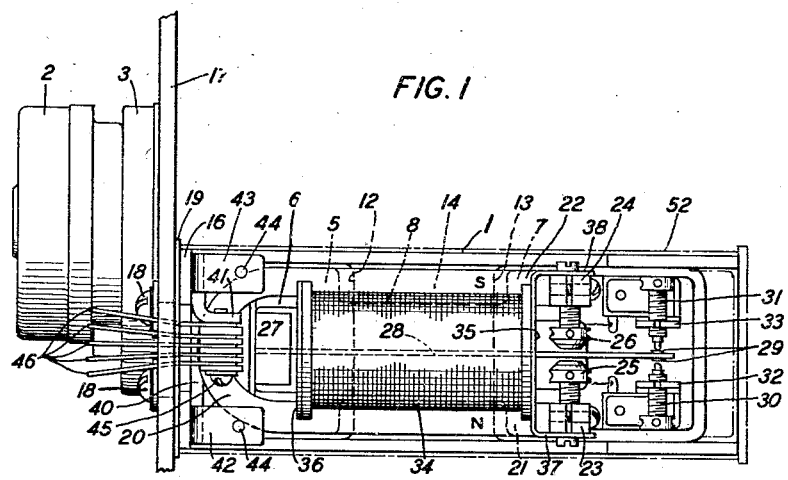
Fig. 1 is a top plan view of the improved impulse generator.
Figure 2:
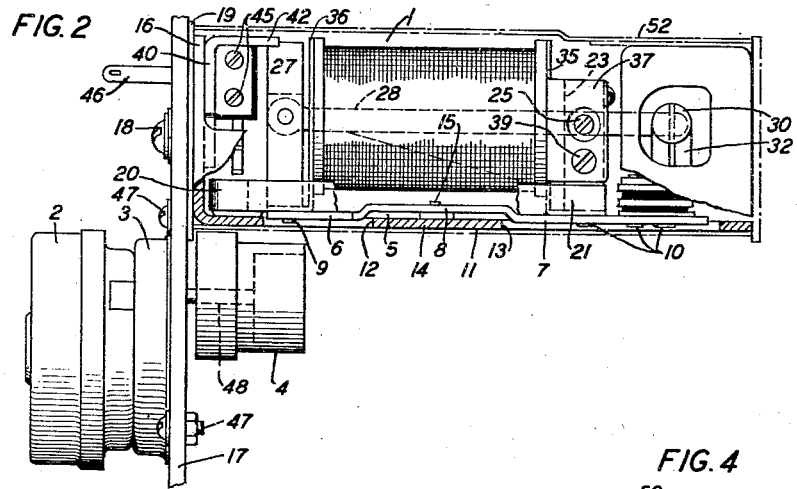
Fig. 2 is a side elevational view.

As hereinbefore stated the impulse generator in accordance with the present invention comprises a polarized relay 1 which may be of any well-known type such as is disclosed for example in Patent 1,938,726, granted December 12, 1933, to W. C. Slauson and a small synchronous motor 2 of the well-known electric clock type provided with the usual reduction gear box 3 and having a rotatable permanent magnet-driving element 4 mounted on the power output shaft of the gear box.

The polarized relay 1 comprises an inner I-shaped base or mounting plate, generally indicated by the numeral 5, upon which the relay structure is mounted, consisting of two end portions 6 and 7 united by an intermediate portion 8, the end portions 6 and 7 serving as feet upon which the rear and front ends of the relay rest, respectively. The rear end of the relay is secured to the end portion 6 of the base 5 by screws 9 and the forward end is secured to the end portion 7 of the base by screws 10. The heads of these screws fit into countersunk openings in the outer faces of the portions 6 and 7. The intermediate portion 8 of the base 5 is slightly raised out of the plane in which the end portions 6 and 7 lie to permit the assembly therewith of an auxiliary base 11 as will presently appear.

The auxiliary base, generally designated by the number 11, is substantially box-shaped being open at the forward end to permit the relay per se and its mounting base 5 to be slipped into position therein and also to permit adjustments of the relay to be made while in service. The base of the auxiliary mounting base 11 is provided with two rectangular apertures 12 and 13 which correspond in size substantially to the dimensions of the end portions 6 and 7 of the base 5. These apertures are separated by the transverse portion 14 of the base to which the base 5 is secured by screws 15. The rear closed end 16 of the auxiliary base 11 serves as a means for supporting the relay on the mounting panel 17 to which it is secured by the screws 18 extending through holes in the panel into threaded holes in the rear end wall 16 of the base 11. For serving as a closure of the inner end of a dust cover 52 when positioned on the relay as indicated by the dot-dash lines, a strip of fiber 19 is interposed between the mounting panel 17 and the rear wall 16 of the base 11 and held in place by the screws 18 which pass through holes therein.

Positioned upon the upper surface of the end portions 6 and 7 of the base 5 is a U-shaped permanent magnet 20 on the pole-piece ends 21 and 22 of which are mounted the vertically extending pole blocks 23 and 24. These blocks are secured to the ends 21 and 22 of the magnet 20 by some of the screws 10 which also serve to secure the magnet and pole blocks to the end portion 7 of the base 5. Pole screws 25 and 26 are threaded through tapped holes in the pole blocks 23 and 24. Secured by the screws 9 to the rear portion 6 of the base 5 is a vertically extending heel-piece 27 to which one end of the reed armature 28 is secured. The free end of this armature extends between the pole-piece ends of the pole screws 25 and 26 and is provided with a contact 29 on each of its faces adjacent its free end. Adjustable contact screws 30 and 31 are mounted in the upper ends of brackets 32 and 33 on either side of the free end of the armature for cooperation with the contacts 29 carried by the armature. The brackets 32 and 33 are insulatedly secured to the front end portion 7 of the base 5 by certain of the screws 10.

Surrounding the reed armature 28 is a coil 34. The coil is provided with an axial sleeve through which the armature freely extends and is supported in the assembly by front and rear L-shaped brackets 35 and 36. The vertical arm of the front bracket 35 is secured to the front spoolhead of the coil and the horizontal arm is secured by some of the screws 10 to the front end portion 7 of the base 5. The vertical arm of the rear bracket 36 is secured to the rear spoolhead of the coil and the horizontal arm is clamped by the screws 9 between the rear portion 6 of the base 5 and the lower end of the heel-piece 27. The vertical arm of the front bracket 35 is also provided with forwardly extending portions 37 and 38 which are secured by screws 39 to the outer faces of the pole blocks 23 and 24 and serve to aid in holding the pole blocks in their proper assembled positions.

Secured to the inner face of the rear wall 16 of the auxiliary base 7 by screws (not shown) is a bracket member 40 having three arms bent at right angles therefrom, one of said arms 41 being bent to lie in a vertical plane as a support for terminal lugs and the other two arms 42 and 43 being bent to lie in the same horizontal plane to serve as a support for the inner end of the dust cover 52. The latter arms are provided with threaded holes 44 to receive screws by which the dust cover may be secured to such arms.

Secured to the bracket arm 41 by the screws 45 and insulated from each other are five terminal lugs 46 which extend through an opening in the rear wall 16 of the base 11 and through an opening in the supporting panel 17. Two of these terminal lugs are connected to the terminals of the coil 34, two are connected to the contact brackets 32 and 33 and the fifth is in conductive engagement with the bracket and through the bases 11 and 5 and the heel-piece 27 with the armature 28.

The synchronous driving motor 2 and its associated reduction gear box 3 may be any of the well-known types employed for driving electric clocks or timing mechanisms or small pieces of apparatus requiring a small amount of power. The motor and its gear box are secured as a unit to the rear of the panel 17 by the bolts 47 and the power shaft 48 from the reduction gear box 3 extends freely through a hole in the mounting panel 17 to the front side of the panel. Secured on the end of the shaft 48 is a driving element 4.

Figure 3:
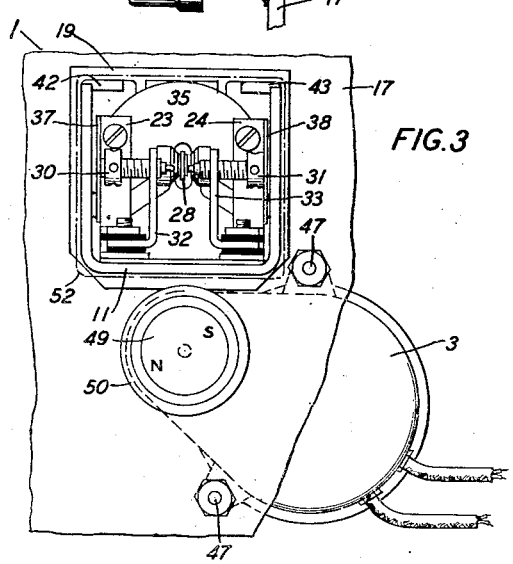
Fig. 3 is an end elevational view.
Figure 4:
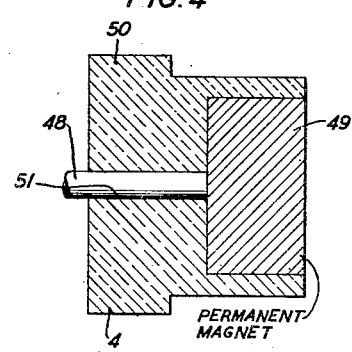
Fig. 4 is an enlarged cross-sectional view of the rotatable permanent magnet.

The element 4 comprises a disc-shaped permanent magnet 49 of high coercive force molded or affixed into a cylindrical support 50 having an axial bore 51 to receive the end of shaft 48. The magnet is so magnetized that the north and south poles are diametrically opposed to each other as indicated in Fig. 3. The support 50 may, for example, be molded from one of the well-known forms of plastics such as Lucite. As illustrated, the motor 2 and associated gear box 3 are so mounted on the panel 17 that the shaft 48 is located in the vertical plane extending through the vertical axis of the heel-piece 27 of the relay so that during the rotation of the permanent magnet disc 49, its polar axis will become aligned with the vertical axis of the heel-piece and the neutral portion of the permanent magnet 20.

It is to be understood, however, that it is not essential that the permanent magnet disc be positioned as disclosed as it has been experimentally demonstrated that the disc could be positioned above the upper end of the heel-piece, above, beneath or at the sides of either of the pole blocks 23 or 24 or of the magnet 20, or adjacent to the armature 28. In fact, it may be located adjacent to any portion of the magnetic circuit of the relay where its rotation will upset the normal magnetic bias of the relay.

The structure of the improved impulse generator having now been described, the operation thereof will be discussed. Normally the pole-piece screws 25 and 26 are adjusted so that the air-gaps between their pole faces and the pole faces of the reed armature 28 are equal and the contacts 29 on the end of the armature are out of engagement with both of the contact screws 30 and 31. The coil 34 is then connected to a source of direct current through a suitable rheostat whereby the armature becomes adjustably biased toward one of the pole screws, for example, toward the pole screw 26 and the end of the armature is brought into engagement with the contact screw 31 as illustrated in Fig. 1. While the coil 34 is illustrated as a means for biasing the relay armature, it will be understood that the cost of the relay may be further reduced by omitting the coil and supplying any of the well-known biasing means, as for example, the biasing spring disclosed in the patent to Slauson hereinbefore referred to or by biasing by a mechanical and magnetic unbalance of the pole-pieces and the air-gaps.

With the armature biased into the position disclosed, when now the motor 2 is driven from a source of 60-cycle alternating current, the shaft 48 and the permanent magnet disc 49 mounted thereon will be driven at the desired pulsing speed of twelve revolutions per second. Upon each revolution of the disc 49 the polar axis thereof will be aligned with the axis of the heel-piece 27 twice, whereby once each revolution the heel-piece 27 and the armature connected thereto will be rendered a north pole in polarity when the north pole of the magnet 49 is presented to the lower end of the heel-piece and will be rendered a south pole in polarity when the south pole of the magnet is presented to the lower end of the heel-piece.

If it be assumed that the permanent magnet 20 of the relay is so positioned as to render the pole block 23 and associated pole screw 25 a north pole and to render the pole screw 26 a south pole, then when the magnet 49 rotates into a position to polarize the armature 28 as a north pole, the armature will be held in its biased position toward the pole screw 26 with its contact end engaged with the contact screw 31. When thereafter the magnet 49 rotates into a position to polarize the armature 28 as a south pole, the armature will be attracted toward the pole screw 25 and repelled from the pole screw 26 and its contact end will engage the contact screw 30 thereby transmitting an impulse to the output circuit of the impulse generator. As the magnet 49 continues its rotation, the polarization of the armature is changed and the engagement between the contact end of the armature and the contact screw 30 is broken. In this manner as the magnet 49 rotates, impulses are generated by the engagement of the armature with the contact screw 30 at the rate of twelve impulses per second.

By adjusting the bias of the relay, the proportion of each rotational cycle of the magnet 49 during which the armature rests on either contact screw may be varied thereby determining the per cent break of the impulse output. Either or both of the contact screws may be wired for use for a variety of output closures of even or uneven length during each rotational cycle. The adjustment of the contact gaps between the armature and the contact screws may provide to some degree a control of a portion of the break interval due to the travel time of the end of the armature. Also the open circuit time may be controlled by the adjustment of the contact separation.

It will be obvious that impulses of any desired impulsing rate may be generated by changing the speed at which the permanent magnet is rotated.

Since the permanent magnet is rotated at a very constant speed by the synchronous motor and the bias of the relay may be very accurately adjusted, the apparatus is capable of generating very accurately timed impulses which are very accurately regulated with respect to their percentage break. Furthermore, since the magnetic drag imposed upon the rotating permanent magnet is very slight, a small inexpensive driving motor may be employed. Since there is no mechanical coupling between the magnet disc and the relay structure a constant relationship free from variations due to mechanical wear, etc. results with low maintenance attention needed.

What is claimed is:

1. In an impulse generator having a magnetic circuit comprising a permanent magnet, pole-pieces secured to the poles of said magnet, adjustable pole screws threaded through said pole-pieces and an armature positioned for movement between said pole screws, a contact with which said armature cooperates and a permanent magnet positioned for rotation adjacent to said magnetic circuit and having no direct magnetic linkage with said armature whereby the flux potential between said armature and said pole screws is periodically altered to cause the periodic engagement of said armature with said contact.

2. In an impulse generator having a magnetic circuit comprising a permanent magnet, pole-pieces secured to the poles of said magnet, adjustable pole screws threaded through said pole-pieces and an armature positioned for movement between said pole screws, a contact with which said armature cooperates, a permanent magnet positioned for rotation adjacent to said magnetic circuit and having no direct magnetic linkage with said armature whereby the flux potential between said armature and said pole screws is periodically altered to cause the periodic engagement of said armature with said contact and means for biasing said armature toward one of said pole screws to adjust the make and break periods of the contact closures.

3. In an impulse generator having a magnetic circuit comprising a permanent magnet, pole-pieces secured to the poles of said magnet, adjustable pole screws threaded through said pole-pieces and an armature positioned for movement between the pole screws, a contact with which said armature cooperates, a permanent magnet positioned for rotation adjacent to said magnetic circuit and having no direct magnetic linkage with said armature whereby the flux potential between said armature and said pole screws is periodically altered to cause the periodic engagement of said armature with said contact and a coil surrounding said armature and energizable to bias said armature toward one of said pole screws to adjust the make and break periods of the contact closures.

4. In an impulse generator having a magnetic circuit comprising a permanent magnet, pole-pieces secured to the poles of said magnet, adjustable pole screws threaded through said pole-pieces and an armature positioned for movement between said pole screws, contacts with which said armature cooperates, a magnetized disc positioned for rotation adjacent to said armature whereby the flux potential between said armature and said pole screws is periodically altered to cause the periodic engagement of said armature with said contacts and a synchronous motor for rotating said disc at a uniform speed.

5. In an impulse generator having a magnetic circuit comprising a permanent magnet, pole-pieces secured to the poles of said magnet, adjustable pole screws threaded through said pole-pieces, a heel-piece and a reed armature secured at one end to said heel-piece and positioned for movement between said pole screws, contacts with which the free end of said armature cooperates, a magnetized disc positioned for rotation adjacent said heel-piece whereby the flux potential between said armature and said pole screws is periodically altered to cause the periodic engagement of said armature with said contacts and a synchronous motor for rotating said disc at a uniform speed.

6. In an impulse generator having a magnetic circuit comprising a permanent magnet, pole-pieces secured to the poles of said magnet, adjustable pole screws threaded through said pole-pieces, a heel-piece and a reed armature secured at one end to said heel-piece and positioned for movement between said pole screws, contacts with which the free end of said armature cooperates, a driving member comprising a magnetized disc and a molded support therefor positioned for rotation adjacent to said heel-piece whereby the flux potential between said armature and said pole screws is periodically altered to cause the periodic engagement of said armature with said contacts and a synchronous motor for rotating said driving member at a uniform speed.

ARNOLD A. HANSEN.